United States Patent
Fu et al.

(10) Patent No.: US 12,489,761 B2
(45) Date of Patent: Dec. 2, 2025

(54) METHOD AND APPARATUS FOR ATTESTING PHYSICAL ATTACKS

(71) Applicant: Nokia Technologies Oy, Espoo (FI)

(72) Inventors: Anmin Fu, Shaanxi (CN); Jingyu Feng, Shaanxi (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 349 days.

(21) Appl. No.: 17/287,405

(22) PCT Filed: Oct. 23, 2018

(86) PCT No.: PCT/CN2018/111407
§ 371 (c)(1),
(2) Date: Apr. 21, 2021

(87) PCT Pub. No.: WO2020/082228
PCT Pub. Date: Apr. 30, 2020

(65) Prior Publication Data
US 2022/0021690 A1 Jan. 20, 2022

(51) Int. Cl.
*H04L 9/40* (2022.01)
*H04L 9/08* (2006.01)

(52) U.S. Cl.
CPC ........ *H04L 63/1416* (2013.01); *H04L 9/0861* (2013.01); *H04L 9/088* (2013.01)

(58) Field of Classification Search
CPC ... H04L 63/1416; H04L 9/0861; H04L 9/088; H04L 63/068; H04L 9/3226; H04W 12/0431
See application file for complete search history.

(56) References Cited

U.S. PATENT DOCUMENTS

| | | | | |
|---|---|---|---|---|
| 6,370,656 B1* | 4/2002 | Olarig | ............... | H04L 41/142 |
| | | | | 709/201 |
| 10,397,085 B1* | 8/2019 | Seth | ............... | G06F 11/0709 |

(Continued)

FOREIGN PATENT DOCUMENTS

| CN | 105610575 A | 5/2016 |
|---|---|---|
| WO | 2015/013440 A1 | 1/2015 |
| WO | 2017/023425 A1 | 2/2017 |

OTHER PUBLICATIONS

"Gartner Says 6.4 Billion Connected "Things" Will Be in Use in 2016, Up 30 Percent From 2015", Gartner, Retrieved on Apr. 13, 2021, Webpage available at : https://www.gartner.com/en/newsroom/press-releases/2015-11-10-gartner-says-6-billion-connected-things-will-be-in-use-in-2016-up-30-percent-from-2015.

(Continued)

*Primary Examiner* — William R Korzuch
*Assistant Examiner* — Matthias Habtegeorgis
(74) *Attorney, Agent, or Firm* — Lippes Mathias LLP (57) ABSTRACT

Methods and apparatus are disclosed for attesting physical attacks. A method may comprise: receiving a heartbeat message from a neighbor device at a periodic interval, wherein the heartbeat message is encrypted with a session key of the neighbor device for a current interval, and comprises a key material for updating the session key of the neighbor device for a next interval; and decrypting the received first heartbeat message based at least part on a session key of the first device for the current interval; and determining whether the neighbor device is physically compromised at least based on the heartbeat message. The periodic interval is set to be smaller than a minimum time of a physical attack on the neighbor device.

18 Claims, 5 Drawing Sheets

(56) References Cited

U.S. PATENT DOCUMENTS

| | | | | |
|---|---|---|---|---|
| 2003/0163697 | A1* | 8/2003 | Pabla | H04L 9/0838 |
| | | | | 713/171 |
| 2003/0229779 | A1* | 12/2003 | Morais | H04L 63/0209 |
| | | | | 713/153 |
| 2009/0034736 | A1* | 2/2009 | French | H04L 63/062 |
| | | | | 380/278 |
| 2013/0185421 | A1* | 7/2013 | Yang | H04L 65/1066 |
| | | | | 709/224 |
| 2013/0263262 | A1* | 10/2013 | Forristal | G06F 11/3041 |
| | | | | 726/22 |
| 2015/0312268 | A1* | 10/2015 | Ray | H04L 63/145 |
| | | | | 726/23 |
| 2016/0080502 | A1* | 3/2016 | Yadav | H04L 43/04 |
| | | | | 709/227 |
| 2016/0117213 | A1* | 4/2016 | Arjun | G06F 11/0757 |
| | | | | 714/55 |
| 2016/0212606 | A1* | 7/2016 | Qi | H04W 8/005 |
| 2017/0126647 | A1 | 5/2017 | Zhang et al. | |
| 2018/0097614 | A1 | 4/2018 | Sherman | |
| 2018/0302861 | A1* | 10/2018 | Zhao | H04W 52/0216 |
| 2019/0065747 | A1* | 2/2019 | Gomes de Oliveira | |
| | | | | H04L 9/0643 |
| 2019/0312838 | A1* | 10/2019 | Grimm | H04L 41/40 |
| 2020/0162434 | A1* | 5/2020 | Tang | H04L 69/40 |
| 2020/0195445 | A1* | 6/2020 | Zhang | H04L 9/3247 |
| 2021/0036960 | A1* | 2/2021 | Xu | H04L 47/2483 |

OTHER PUBLICATIONS

Zhang et al., "IoT Security: Ongoing Challenges and Research Opportunities", IEEE 7th International Conference on Service-Oriented Computing and Applications, 2014, pp. 230-234.

Trappe et al., "Low-Energy Security: Limits and Opportunities in the Internet of Things", IEEE Security & Privacy, vol. 13, No. 1, Jan./Feb. 2015, pp. 14-21.

Steiner et al., "Attestation in Wireless Sensor Networks: A Survey", ACM Computing Surveys, vol. 49, No. 3, Article 51, Sep. 2016, pp. 1-31.

Defrawy et al., "SMART: Secure and Minimal Architecture for (Establishing a Dynamic) Root of Trust", In: Proceedings of the 19th Annual Network and Distributed System Security Symposium, 2012, 15 pages.

Asokan et al., "SEDA: Scalable Embedded Device Attestation", Proceedings of the 22nd ACM SIGSAC Conference on Computer and Communications Security, Oct. 2015, pp. 964-975.

Ambrosin et al., "SANA: Secure and Scalable Aggregate Network Attestation", Proceedings of the 2016 ACM SIGSAC Conference on Computer and Communications Security, Oct. 24-28, 2016, pp. 731-742.

Wang et al., "Enabling Security-enhanced Attestation With Intel SGX for Remote Terminal and IoT", IEEE Transactions on Computer-Aided Design of Integrated Circuits and Systems, vol. 37, No. 1, Jan. 2018, pp. 88-96.

Moon et al., "Cooperative Remote Attestation for IoT Swarms", International Conference on Information and Communication Technology Convergence (ICTC), Oct. 2016, pp. 1233-1235.

Zeitouni et al., "Cooperative Remote Attestation for IoT Swarms", IEEE/ACM International Conference on Computer-Aided Design (ICCAD), Nov. 2017, pp. 384-391.

Ibrahim et al., "DARPA: Device Attestation Resilient to Physical Attacks", Proceedings of the 9th ACM Conference on Security & Privacy in Wireless and Mobile Networks, Jul. 18-22, 2016, pp. 171-182.

Kohnhäuser et al., "Scalable Attestation Resilient to Physical Attacks for Embedded Devices in Mesh Networks", arXiv, Jan. 2017, 15 pages.

Abera et al., "Things, Trouble, Trust: on Building Trust in Iot Systems", DAC '16 Proceedings of the 53rd Annual Design Automation Conference, 2016, 42 pages.

Marchal et al., "Internet of Things (IoT) Security: Threats, Challenges & Recommendations", MSS—Lecture 6 (part 1), Aalto University, 102 pages.

Abera et al., "Invited Things, Trouble, Trust: On Building Trust in Iot Systems", 53nd ACM/EDAC/IEEE Design Automation Conference (DAC), Jun. 5-9, 2016, 6 pages.

Ahmed et al., "Program-flow Attestation of Iot Systems Software", 15th Learning and Technology Conference (L&T), 2018, pp. 67-73.

Tsudik, "Smart everything: Dr Jekyll or Mr Hyde? Cure by Remote Attestation", Computer Science Department UCI, 2016, pp. 1-26.

International Search Report and Written Opinion received for corresponding Patent Cooperation Treaty Application No. PCT/CN2018/111407, dated Jul. 19, 2019, 9 pages.

Extended European Search Report received for corresponding European Patent Application No. 18937799.7, dated May 11, 2022, 6 pages.

Kohnhäuser et al., "SCAPI: A Scalable Attestation Protocol to Detect Software and Physical Attacks", Proceedings of the 10th ACM Conference on Security and Privacy in Wireless and Mobile Networks, Jul. 2017, pp. 75-86.

Office action received for corresponding Indian Patent Application No. 202147022128, dated May 17, 2022, 6 pages.

* cited by examiner

METHOD AND APPARATUS FOR ATTESTING PHYSICAL ATTACKS

FIELD OF THE INVENTION

Embodiments of the disclosure generally relate to information technology, and more particularly, to attestation for physical attacks for devices in a network.

BACKGROUND

Nowadays, Internet of Things (IoT) devices are permeating our environments. They are widely used in industrial control, smart office, health care, military communication and so on. It is forecasted that 20.8 billion connected things will be in use worldwide by 2020. Since these devices always store large amount of private information or control physical equipment, they become an attractive target for adversaries. A compromised device may result in not only privacy disclosure but also the collapse of the entire network in a contagious manner. Therefore, protecting these devices against different kinds of attacks becomes an important security issue.

However, different from other computing devices, IoT devices are often limited in energy, computing capability and memory. Thus, IoT devices usually lack necessary resources to defend against attacks. Thus, researchers propose to use remote attestation to determine whether they have been compromised. Remote attestation usually follows a challenge-response mechanism. It allows a trusted party (also referred to as verifier) to send a challenge to other untrusted and possibly compromised parties (also referred to as prover). The provers will generate a response according to the challenge and its current operating status. At last, the verifier can determine prover's status via the response and some previous knowledge.

In order to have little impact on the normal mission about these devices, many light-weight and efficient schemes have been proposed so far. But most current remote attestation schemes only consider only software attacks. Physical attacks on provers are generally ruled out. However, it is certain that these devices also suffer from physical attacks, as they are deployed in an open environment. All the physical attacks exploit the devices by real-life contact without network communication. There are many means of physical attacks. The most common physical attack is to extract information from a device by trying to directly access internal components using sophisticated and expensive specialized equipment, such as Focused Ion Beam and micro-probing stations. Recently, another kind of physical attack is also introduced, where adversary can temper with the hardware of a normal device to get a strong ability of storing. Then the device can easily bypass the tradition attestation. It can be seen that, those physical attacks will bring greater damage than the software attacks. However, as such attacks do not need to inject new malicious code, the traditional attestation schemes lack the ability to resist such attacks.

Therefore, how to attesting physical attacks becomes a security issue that needs to be solved.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to first aspect of the disclosure, it is provided a method implemented at a first device. Said method may comprise receiving a first heartbeat message from a neighbor device at a periodic interval. The first heartbeat message is encrypted with a session key of the neighbor device for a current interval, and comprises a first key material for updating the session key of the neighbor device for a next interval. The method further comprises decrypting the received first heartbeat message based at least part on a session key of the first device for the current interval. The method further comprises determining whether the neighbor device is physically compromised at least based on the first heartbeat message. The periodic interval is set to be smaller than a minimum time of a physical attack on the neighbor device.

In an embodiment, the method may further comprises obtaining the first key materials from the decrypted first heartbeat message; and updating the session key of the first device for the next interval based at least part on the first key material.

In an embodiment, the method may further comprise obtaining the session key of the first device for the current interval from a network managing device.

In an embodiment, when no first heartbeat message is received from the neighbor device within the current interval, or the received first heartbeat message is not successfully decrypted, or the decrypted first heartbeat message is not valid, the neighbor device may be determined to be physically compromised.

In an embodiment, if it is determined that the neighbor device is physically compromised, the method may further comprise: sending a report to a network managing device indicating that the neighbor device is suspicious to be physically compromised. The method may further comprise doing a self-measurement of software integrity at the first device; and sending a result of the self-measurement of software integrity to the network managing device.

In an embodiment, the method may further comprise generating and sending a second heartbeat message to the neighbor device at the periodic interval. The second heartbeat message may be encrypted with the session key of the first device for the current interval. The second heartbeat message may comprise a second key material for updating the session key of the first device for the next interval.

In this embodiment, the method may further comprise updating the session key of the first device for the next interval based at least part on the second key material. The receiving of the first heartbeat message may be timed within a period from a start of the current interval, and the sending of the second heartbeat message may be timed within the period from the start of the current interval. The updating of the session key of the first device for the next interval based at least part on the second key material may be executed after the decrypting of the received first heartbeat message, or an expiration of the period from the start of the current interval, whichever occurs earlier. The method may further comprises keeping synchronization between the first device and the neighbor device for the transmission of the first heartbeat message and the second heartbeat message.

In an embodiment, the first heartbeat message may further comprise an identifier of the neighbor device.

In an embodiment, the key material for generating a session key may comprise a nonce.

In an embodiment, both the first device and the neighbor device may be internet of things devices.

According to second aspect of the disclosure, it is provided an apparatus. Said apparatus may comprise at least one processor, at least one memory including computer program code, the memory and the computer program code configured to, working with the at least one processor, cause the apparatus to receive a first heartbeat message from a neighbor device at a periodic interval. The first heartbeat message is encrypted with a session key of the neighbor device for a current interval, and comprises a first key material for updating the session key of the neighbor device for a next interval. The apparatus is further caused to decrypt the received first heartbeat message based at least part on a session key of the first device for the current interval, and determine whether the neighbor device is physically compromised at least based on the first heartbeat message. The periodic interval is set to be smaller than a minimum time of a physical attack on the neighbor device.

According to third aspect of the present disclosure, it is provided a computer readable storage medium, on which instructions are stored, when executed by at least one processor, the instructions cause the at least one processor to perform the method according to the first aspect.

According to fourth aspect of the present disclosure, it is provided computer program product comprising instructions which when executed by at least one processor, cause the at least one processor to perform the method according to the first aspect.

These and other objects, features and advantages of the disclosure will become apparent from the following detailed description of illustrative embodiments thereof, which is to be read in connection with the accompanying drawings.

DETAILED DESCRIPTION

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" and "communication network" refers to a wired or wireless network. For example, the wireless network may follow any suitable communication standards, such as new radio (NR), long term evolution (LTE), LTE-Advanced, wideband code division multiple access (WCDMA), high-speed packet access (HSPA), and so on. Furthermore, the communications among devices in the network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either now known or to be developed in the future.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As described above, most of the traditional attestations just focus on the software attacks. Physical attacks on provers are generally ruled out. However, physical attacks must be considered. The physical attacks possess a characteristic different from software attacks. It is that they must take these devices offline for a certain time to do some physical operation. Based on this characteristic, some schemes can be proposed to detect physical attacks by heartbeat message.

For example, in an attestation scheme, a light-weight protocol is proposed to take advantage of absence detection to identify suspected devices. Each device periodically emits a heartbeat message that needs to be received, verified and logged by every other device in the network. However, it has several shortcomings. Firstly, the number of sent messages per heartbeat period is O(n2) where n is the total number of devices in the network. This will cause larger amount of energy consumption and longer run time in large network. Secondly, each device needs to record all heartbeat message of others, which increases the consumption of memory space.

In another attestation scheme, a same hash value generated by a leader device is used as the heartbeat message. Each device having two correct heartbeat message would be think as physically healthy one. It reduces the communication complexity from O(n2) in DARPA to O(n). However, using the same heartbeat message generated by leader device, it may suffer from collusion attack, where compromised device can ask for newest heartbeat messages from another device to bypass the attestation. Moreover, the current heartbeat message relies on the leader device, whenever leader device was compromised it will cause so-called signal point of failure problem. Thus it must spend more time and energy to select a new leader.

Existing attestation schemes resilient to physical attacks further have a lot of problems in security and efficiency. In general, the problems lie in the following four aspects. Firstly, existing attestation schemes lacks a quick response to the potentially compromised devices. Specific compromised devices can only be known after a periodic attestation. When one compromised device comes back during such periodic interval, it can execute other attacks easier and quicker. It poses a serious security hole. Secondly, the existing attestation schemes may occupy too much memory or suffer from single point failure. The existing attestation schemes either let each device record all heartbeat messages, which waste too much memory, or let each device just record heartbeat message from lead device, which may cause single point failure. However, IoT devices are limited in memory and single point failure will cause great security problem.

Thirdly, the existing attestation schemes may bring relatively high communication overheard of a heartbeat protocol. The run-time will increase with the number of devices in the network, which may cause great time consumption in large network. Fourthly, the existing attestation schemes almost authentication others devices via verifying the signatures or a challenge-response mode. It will cause much time wasting.

This disclosure present efficient attestation scheme for devices that is resilient to physical attacks. As described above, physical attacks on any device in the network will require to offline the device for a certain time. Based on this characteristic, an attestation scheme is designed, in which heartbeat messages are generated and transmitted between verifier and prover in a periodic interval smaller than the minimum time an adversary needed to physically attach one device. Every device can both serve as verifier and prover. In embodiments of this disclosure, neighbor devices are utilized to serve as verifiers to attest the prover.

Figure 1:
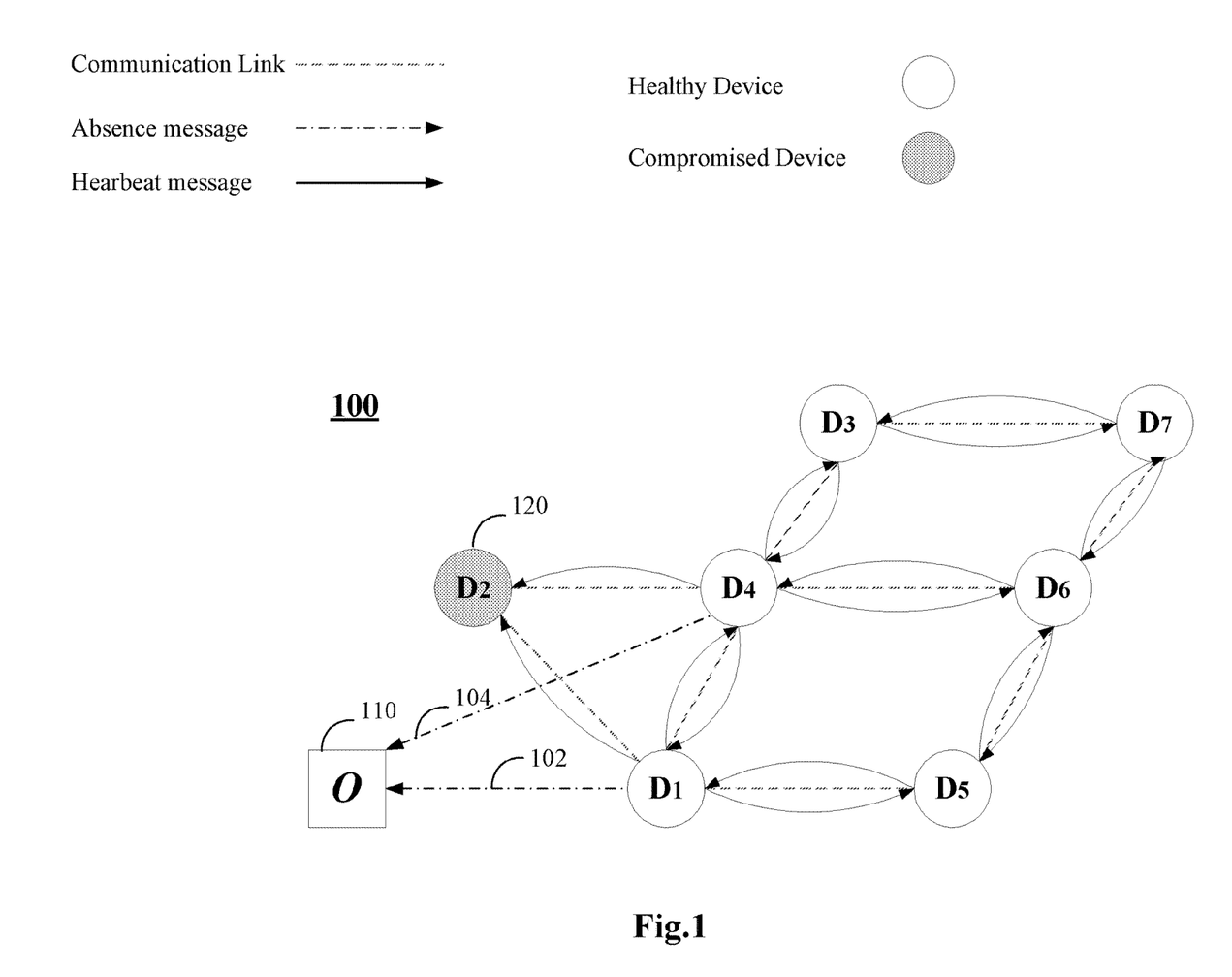
FIG. 1 schematically shows a network in which embodiments of the present disclosure can be implemented.

FIG. 1 shows a network in which embodiments of the present disclosure can be implemented. $D_1, D_2, \ldots, D_7$ are devices in the network, such as IoT devices. These devices can communicate with each other through the communication links as shown in FIG. 1. each device in the network can serve as a verifier to verify the presence of its neighbor devices. Meanwhile, each device in the network can serve as a prover to be verified by its neighbor devices. For example, as shown in FIG. 1, $D_1$ is connected with $D_2$, $D_4$ and $D_5$ with a one-hop communication link, and thus $D_2$, $D_4$ and $D_5$ are neighbor devices of $D_1$. $D_1$ can be configured to receive hearbeat messages sent from $D_2$, $D_4$ and $D_5$ periodically, and verify whether $D_2$, $D_4$ and $D_5$ are compromised by a physical attack. $D_1$ can be further configured to send heartbeat messages to $D_2$, $D_4$ and $D_5$ periodically, so that $D_2$, $D_4$ and $D_5$ can receive hearbeat messages from $D_1$ to verify whether $D_1$ is compromised by a physical attack.

Although there are seven devices illustrated in FIG. 1, it should be understood that the network may comprise more or less devices. In practice, in a network, there may at least three neighbor devices for each device.

The network can further comprise a device for network managing and operating, as depicted by the node O in FIG. 1. In some embodiments, this device may be a device of the network's owner. In some other embodiments, this device may be a leader device among the IoT devices. The node O can be configured to manage the devices in the network. In some embodiment, the node O can be configured to receive report of the attestation of physical attacks from devices in the network. FIG. 1 shows an exemplary scenario where $D_2$ is the device that physically attacked. Its neighbor devices $D_1$ and $D_4$ may detect an absence of $D_2$, and then report absence messages to the node O.

Each device in the network can be provided with a write-protected real-time clock, so that each device can execute the attestation periodically in a synchronized manner. These clocks may be loosely synchronized with one clock, such as the clock of the node O, O's clock. In this regard, there may be a small clock skew between clocks of two devices. For example, At represents a maximum clock skew between any two devices in the network.

Figure 2:
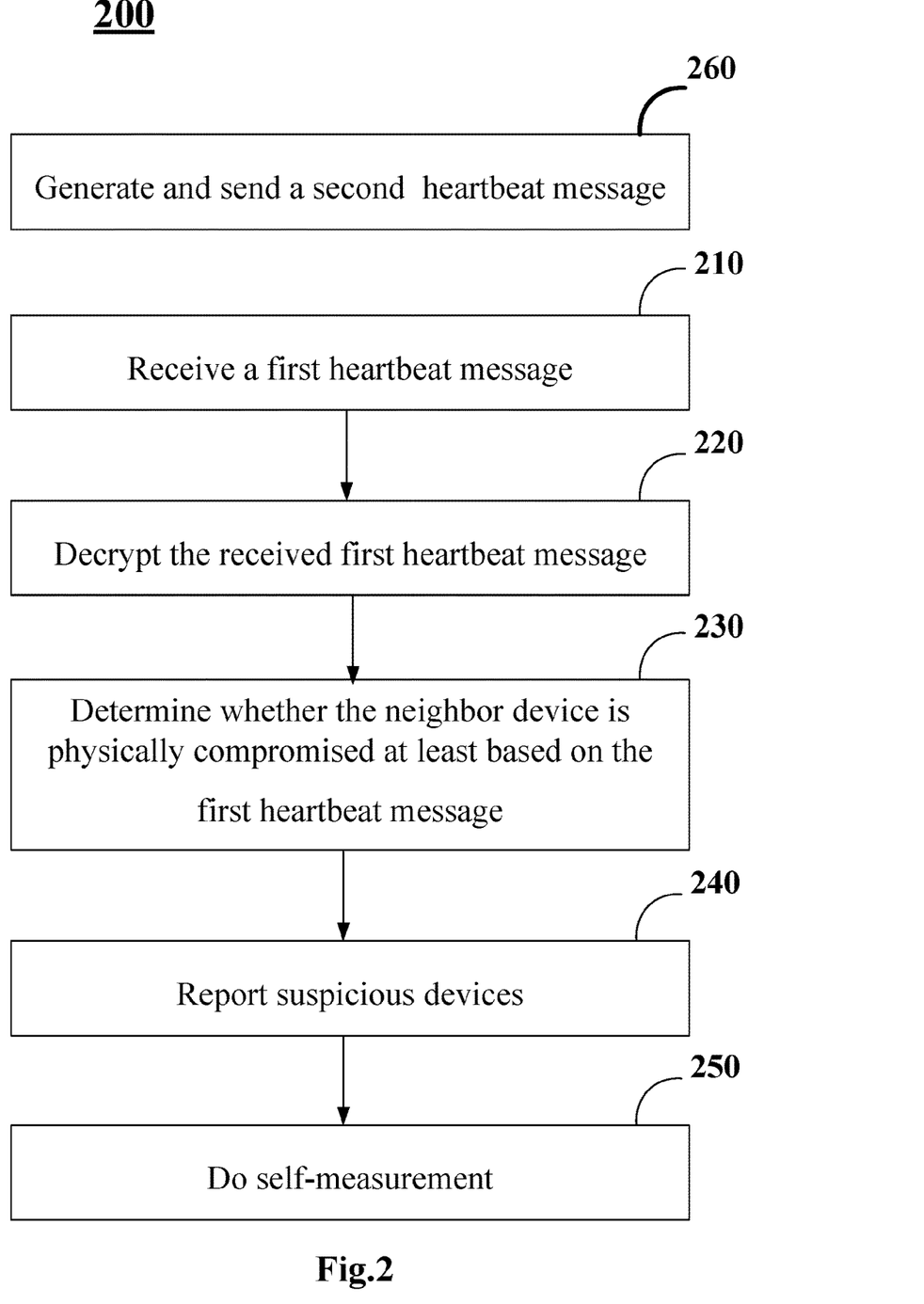
FIG. 2 is a flow chart depicting a method according to an embodiment of the present disclosure.

FIG. 2 illustrates a flow chart depicting a procedure executed by a first device for attesting physical attacks according to an embodiment of the present disclosure. At block 210, the first device can receive a heartbeat message from a neighbor device at a periodic interval. This periodic interval is set to be smaller than a minimum time of a physical attack on the neighbor device. The heartbeat message is encrypted with a session key of the neighbor device for a current interval. In this regard, the session key may be updated for each interval of heartbeat message transmission between the neighbor device and the first device. The heartbeat message comprises key materials for updating the session key for a next interval.

At block 220, the first device can decrypt the received heartbeat message based at least part on the session key of the first device for the current interval. The session key for the current interval may be allotted by a network managing device, such as node O shown in FIG. 1. For example, an initial session key may be allotted when the first device or the neighbor device enters the network. As the attestation is executed periodically, heartbeat messages are transmitted periodically. The heartbeat message transmitted in a last interval may comprise key materials for updating the session key for a current interval. Thus, the session key for the current interval may be derived from a last heartbeat message received from the neighbor device in the last interval.

At block 230, the first device can determine whether the neighbor device is physically compromised based on the heartbeat message. In this regard, if no heartbeat message is received or correctly received from the neighbor device within the current interval, it can be determined that the neighbor device is physically compromised. For example, if the heartbeat message is not successfully decrypted, or the decrypted heartbeat message is not valid, it can be determined that the neighbor device is physically compromised.

At block 240, if it is determined that a neighbor device is physically compromised, the first device can send a report to a network managing device, such as the node O in FIG. 1, indicating that the neighbor device is suspicious to be physically compromised. At block 250, the first device can further do a self-measurement of software integrity, and send a result of the self-measurement to the network managing device. The self-measurement can be utilized to avoid false report. In some embodiments, the self-measurement can be triggered in response to a request from the network managing device.

If the heartbeat message is correctly received, it can be determined that the neighbor device is healthy till the current interval. Then, the first device can obtain the key materials from the decrypted heartbeat message, and partly update the session key of the neighbor device for a next interval based at least part on the key material. Then, the first device can wait for receiving a next heartbeat message in the next interval.

Meanwhile, the first device can serve as a prover. As shown at block 260, the first device can generate a heartbeat message and send it to its neighbor device at a periodic interval. This period interval is set to be smaller than a minimum time of a physical attack on the first device. This periodic interval is set be same as the periodic interval of the heartbeat message of the neighbor device. Preferably, the first device can be synchronized with its neighbor device, so that they transmit heartbeat messages essentially at a same time. Further, all devices in the network can take a same periodic interval for transmitting heartbeat message and executing the attestation for physical attack. This heartbeat message is encrypted with a session key of the first device for a current interval, and comprises a key material for updating the session key of the first device for a next interval.

As described above, each device will change its session key with its heartbeat message sending in each interval. The first device may update its session key for the next interval based at least part on the key material after of the decryption of the heartbeat message received from its neighbor device for the current interval. For example, the first device may update its session key when generating the heartbeat message for the next interval.

By virtue of the heartbeat message sent from the first device, its neighbor device can verify whether the first device is physically compromised, in a similar way as discussed with respect to blocks 210 to 250.

There are several differences between the schemes of this disclosure and prior art. Firstly, the schemes of the disclosure introduce an accusation mechanism. In the exiting schemes, the network owner can only know such compromised devices after a periodic attestation. However, one physically compromised devices coming back to the network during the attestation period may easily bypass such attestation, because such devices have better computing capabilities. In the accusation mechanism of the schemes of the disclosure, the attestation is executed at a periodic interval smaller than a minimum time of a physical attack. The network owner can know the physically compromised devices as early as possible.

Secondly, the schemes of the disclosure introduce a distributed attestation mode. The current attestation models either made each devices record all heartbeat message, which cause large waste of memory, or let one spread heartbeat message to many others, which cause single point failure. The schemes of the disclosure adopt the distributed attestation model, in IoT network, for example. The neighbor devices are utilized to attest the prover, so that it can reduce the waste of memory and also prevent a single point of failure.

Thirdly, the schemes of the disclosure can utilize a loosely synchronized clock, so that each device can execute the attestation at the same time. The execute time for attestation of the whole network will only be affected by the number of neighbor devices. In contrast, in current attestation schemes for physical attacks, some device must wait for some event coming from other devices to trigger their corresponding events. It may cause great time consumption in larger network.

Fourthly, the schemes of the disclosure introduce a zero-round authentication method. In each attestation round in an interval, only one heartbeat message is needed to be transferred from a prover to a verifier. Current attestation schemes usually follow the challenge-response mechanism, which cause extra energy and time consumption in communication. Meanwhile, the schemes of the disclosure utilize a session key to authenticate one device, and the session key will change with the heartbeat message sending. This is also advantage to prevent impersonation attacks.

Figure 3:
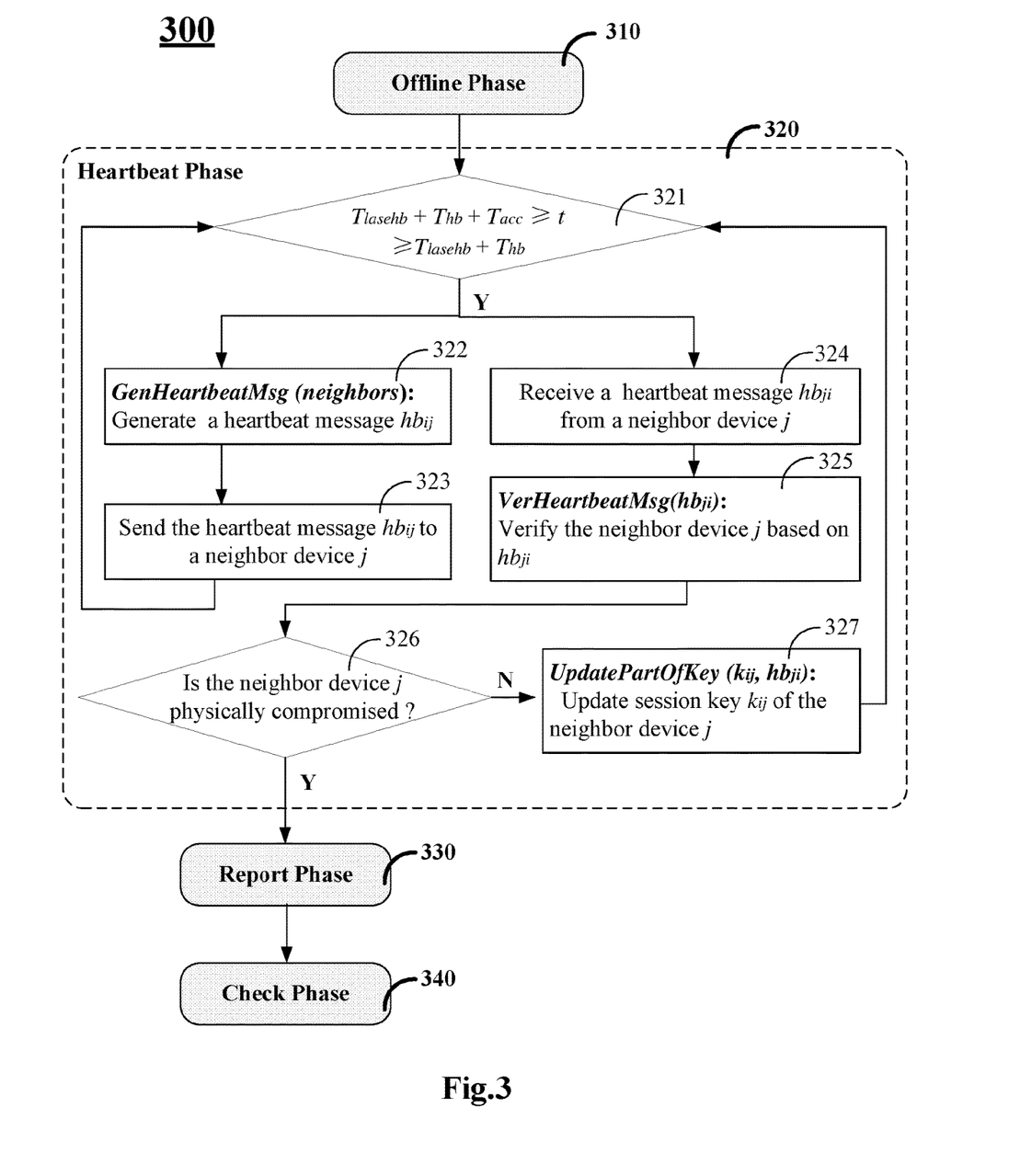
FIG. 3 is a flow chart depicting a method according to an embodiment of the present disclosure.

Now reference is made to FIG. 3, which shows a flow chart depicting an exemplary attestation procedure in a device according to an embodiment of the present disclosure. In this embodiment, the attestation procedure for physical attacks can be executed at different time point. As shown in FIG. 3, the procedure can be divided into four phases, comprising an Offline phase 310, a Heartbeat phase 320, a Report phase 330 and a Check phase 340.

In an offline phase 310, devices can be configured or initialized with initial parameters. In an embodiment, in an offline phase, a device (denoted as $D_i$) may be deployed into a network (as shown in FIG. 1), for example, by the owner of the network. Before the deployment, it can be assumed that all devices are in a healthy state. Before a device $D_i$ join in the network, the owner (e.g. the node O in FIG. 1) may allot a symmetric key $dk_i$, an asymmetric key pair ($pk_i$, $sk_i$) and a distinct identifier $id_i$ to the device $D_i$. Then, the device $D_i$ can join in the network, i.e., the new device establishes connections to all neighbor nodes. The owner's node O may inform all its neighbors about the identifier $id_i$ of the new device $D_i$, and inform the new device $D_i$ of its neighbors' identifiers. Meanwhile, the owner's node O may allot a session key to each pair of neighboring devices for data transmission between the pair of neighboring devices. The session key is a symmetric key. For example, $k_{ij}$ can be used to represent the session key held in $D_i$ for the data transmission between $D_i$ and $D_j$, while $k_{ji}$ can be used to represent the session key held in $D_j$ for data transmission between $D_i$ and $D_j$. Both of the neighboring devices $D_i$ and $D_j$ can obtained the pair of session keys ($k_{ij}$, $k_{ji}$). Although different symbols are used to represent session key in different devices, the session key between a pair of neighboring devices would show the same value, because the session key was the symmetric key. As the session key was used to symmetric encryption. Only when $k_{ij}=k_{ji}$, $D_i$ and $D_j$ can decrypt the message sending from each other. In some embodiments, every device may record a value $D_{i\_present}$ for each of its neighbor device $D_i$, which indicates the presence of neighbor device $D_i$. For example, when the new device $D_j$ joins into the network, its neighbor device $D_j$ may set a value $D_{i\_present}$ to indicate that the device $D_i$ is in a healthy state.

Taking the network of FIG. 1 as an example, it is assumed that $D_2$ is a new device to be deployed in the network. When $D_2$ joints in the network and are connected to devices $D_1$ and $D_4$, the node O may inform $D_1$ and $D_4$ of $D_2$'s identifier $id_2$, and inform $D_2$ of $D_1$' identifier $id_1$ and $D_4$' identifier $id_4$. Meanwhile, the node O may allot a pair of initial session keys ($k_{12}$, $k_{21}$) to the neighboring devices $D_1$ and $D_2$, and allot a pair of initial session keys ($k_{42}$, $k_{24}$) to the neighboring devices $D_4$ and $D_2$. Initially, $k_{12}=k_{21}$ and $k_{42}=k_{24}$. Furthermore, $D_1$ and $D_4$ may set a value $D_{2\_present}=1$ to indicate that the device $D_2$ is in a healthy state. Meanwhile, $D_2$ may set a value $D_{1\_present}=1$ and a value $D_{4\_present}=1$ to indicate that the devices $D_1$ and $D_4$ are in a healthy state, respectively.

After the initialization, the device D2 can enter in a heartbeat phase 320. In this phase, devices in the network can serve as verifiers and provers by distributing heartbeat messages between neighbor devices. In this regard, each device periodically sends a message (called heartbeat) to its neighbor devices. The periodic interval is $T_{hb}$, $T_{hb}<T_{cap}$, which denotes the minimum time an adversary needed to physically attack one device. Neighbor devices can claim that a device who offline for more than $T_{hb}+\Delta t$ time is physically compromised.

This phase can be described by virtue of a three-tuples of algorithms (GenHeartbeatMsg, VerHeartbeatMsg, UpdatePartOfKey). In some embodiments, the heartbeat phase can be timed within a period from a start of every periodic heartbeat interval. The period can be extended from a start of an interval till a maximum time needed for heartbeat message transmission has expired. As shown at block 321, upon current time t satisfied a function TimeStart(t), i.e., $T_{lasehb}+T_{hb}+T_{acc} \geq t \geq T_{lasehb}+T_{hb}$, every device executes these algorithms for neighbor devices. Before the execution, a device can set $D_{i\_present}=0$ for each neighbor $D_i$. $T_{lasthb}$ represents a last execute time of attestation. For example, it can be a start time for the last heartbeat phase in the last periodic heartbeat interval. $T_{acc}$ represents a maximum time needed for transmission for a heartbeat message. Since the heartbeat message is transferred between neighbor devices, $T_{acc}$ can be very small. Obviously, $T_{acc}$ is smaller than $T_{hb}$.

Upon the current time t satisfied a function TimeStart(t), a device $D_i$ can be triggered to execute GenHeartbeatMsg (neighbors) to generate a heartbeat message for each of its neighbor device $D_j$, as shown in block 322. In an example, $D_i$ can randomly chooses a nonce $n_i$. For each neighbor device $D_j$, $D_i$ can encrypt its $id_i$ and $n_i$ with the session key $k_{ij}$. The generated heartbeat message can be denoted as $hb_{ij}=Enc$ $(k_{ij}, (id_i||n_i))$. Then, $D_i$ sends its heartbeat message $hb_{ij}$ to each neighbor device $D_j$, as shown at block 323.

Similarly, upon the current time t satisfied a function TimeStart(t), a device $D_j$ can be triggered to execute GenHeartbeatMsg(neighbors) to generate a heartbeat message for each of its neighbor device $D_i$. The generated heartbeat message can be denoted as $hb_{ji}=Enc$ $(k_{ji}, (id_j||n_j))$. Then device $D_j$ can send the heartbeat message $hb_{ji}$ to its neighbor device $D_i$.

Meanwhile, upon the current time t satisfied a function TimeStart(t), the device $D_i$ can be triggered to execute VerHeartbeatMsg($hb_{ji}$) to verify whether its neighbor device $D_j$ is physically compromised. As shown at block 324, the device $D_i$ can receive the heartbeat message $hb_{ji}$ from its neighbor device $D_j$. Whenever $D_i$ receives a heartbeat message $hb_{ji}$ from device $D_j$, it can set $D_{j\_present}$=VerHeartbeatMsg $(hb_{ji})$.

In VerHeartbeatMsg($hb_{ji}$), as shown at block 325, the device $D_i$ can try to decrypt $hb_{ji}$ using its session key $k_{ij}$. If the message $hb_{ji}$ is decrypted successfully, then the device $D_i$ can check whether the decrypted message $hb_{ji}$ is valid. For example, it can check the $id_j$. If the $id_j$ in the message $hb_{ji}$ is equal to the identifier of $D_j$, it can be determined that the heartbeat message was valid. Accordingly, a result value of VerHeartbeatMsg($hb_{ji}$) can be output, as VerHeartbeatMsg $(hb_{ji})$=1. Otherwise, if the decrypted message $hb_{ji}$ is not valid, the device $D_i$ can discard the heartbeat message $hb_{ji}$ and output a result value VerHeartbeatMsg($hb_{ji}$)=0.

If VerHeartbeatMsg($hb_{ji}$)=1, it means that the neighbor device $D_j$ is not physical compromised. Then, as shown at block 327, the device $D_i$ can execute UpdatePartOfKey($k_{ij}$, $hb_{ji}$), to partly update its session key $k_{ij}$. In this regard, the device $D_i$ can extract the nonce $n_j$ form $hb_{ji}$, and update the session key $k_{ij}$ based at least part on the extracted nonce, for example by $k_{ij}=k_{ij} \oplus n_j$. As shown by the arrow from block 327 to block 321, the device $D_i$ can wait for the next heartbeat period at block 321.

It is assumed that each healthy neighbor device will also update its session key based at least part on the nonce sent to its neighbor. In this embodiment, the device $D_i$ can execute UpdateKey(neighbors), to further update each of its session key $k_{ij}$, for example by using its nonce $n_i$ through $k_{ij}=k_{ij} \oplus n_i$. As $k_{ij}$ has been partly updated with UpdatePartOfKey($k_{ij}$, $hb_{ji}$), the relation between the session key of the current interval and the session key of the next interval can be defined as: $k_{ij}=k_{ij} \oplus n_j \oplus n_i$. Correspondingly, the neighbor device $D_j$ can also execute UpdatePartOfKey($k_{ji}$, $hb_{ij}$) by using the nonce $n_i$ in the heartbeat message from $D_i$, and execute UpdateKey(neighbors) by using its own nonce $n_j$, to update its session key $k_{ji}$, so that its new session key of the next interval can be defined as: $k_{ji}=k_{ji} \oplus n_i \oplus n_j$. As such, Di and Di can hold a same symmetric key at each interval, if only they are healthy.

The nonce $n_j$ can be generated by $D_j$ itself, for example when it generates the heartbeat message $h_{ji}$ for the current heartbeat period. Alternatively, the nonce $n_j$ can be generated after a VerHeartbeaMsg($h_{ji}$) of the last heartbeat period has been executed. The updated session key from UpdateKey (neighbors) will be used to encrypt and decrypt a next heartbeat message to be transferred between $D_i$ and $D_j$ in a next heartbeat interval. In some embodiments, a session update with UpdateKey(neighbors) can be executed after the device has receiving all healthy neighbors' heartbeat messages.

As such, every device can use the session key to identify each other, since the session key changed with the heartbeat message sending. The device that was absent during the last heartbeat period will have different session key with its neighbors. For example, when $D_j$ was physically attacked, $D_j$ was offline during the last interval. Then, it cannot get the heartbeat message from $D_i$. $D_j$ just can update the session key $k_{ji}$ once for the heartbeat current interval. Then, the two devices can't communicate with each. The session key $k_{ji}$ will never be same as the session key $k_{ij}$. Without correctly decrypting with $D_i$'s session key $k_{ij}$, a heartbeat message $hb_{ji}$ which is encrypted with session key $k_{ji}$, $D_i$ can determine that Dj is suspicious to be physically attacked. Without receiving correct heartbeat message from $D_j$, $D_i$ cannot derive the new session key for a next heartbeat period. Then, the two devices can't communicate with each. In another example, when $D_j$ was physically attacked, $D_j$ cannot send a heartbeat message to $D_i$ or cannot send a correct heartbeat message to $D_i$. All of its neighbors cannot receive its heartbeat message, then $D_j$ has different session keys with all of its neighbors. So $D_j$ cannot decrypt any heartbeat message in the network.

If VerHeartbeatMsg($hb_{ji}$)=0, it means that the neighbor device $D_j$ is suspicious to be physical compromised. Then, the device $D_i$ can proceed to a report phase 330 to report one absence message to the network owner (such as node O). In an embodiment, the device $D_i$ can proceed to the report phase 330 after it has checked the presence of each of its neighbor devices in the network.

In an embodiment, when a function Timeout(t) is satisfied, i.e., $t \geq T_{lasehb}+T_{hb}+T_{acc}$, every device may be triggered to check all its neighbors' presence via the value of $D_{i\_present}$. If none valid heartbeat message is received from one neighbor $D_j$, then from $D_i$'s perspective, $D_j$ is absent, i.e., $D_{j\_present}=0$. The verifier device may execute a function of AbsenceReport(neighbors), to send one absence message which contains all the absent devices' identifiers to the node O.

For example, the function of AbsenceReport(neighbors) executed in Di can firstly initialize a bit string $sus\_id_p$=NULL, which contains the identifiers of the devices that are suspicious to be physically compromised in the $p^{th}$ heartbeat period. For each neighbor $D_j$, the function can check the value of $D_{j\_present}$. The function can set $sus\_id_p = sus\_id_p \| id_j$, if the value of $D_j\_present$ equals to 0. Otherwise if the value of $D_j\_present$ equals to 1, the function will skip to check a next neighbor device. Finally, the function can encrypt a string "absence" and $sus\_id_p$, the current time t with the key $dk_i$, if sus_id doesn't equal to NULL. The final absence message can be defined as $ab_i$=Enc $(dk_i, ("absence"\|t\|sus\_id_p))$. Then, Di can send the absence message $ab_i$ to the node O. To prevent absence messages from being intercepted, every device can record such $sus\_id_p$ and add these messages to a periodic attestation result.

In some embodiments, $D_i$ can execute UpdateKey(neighbors) in the report phase 330, to update each of its session key $k_{ij}$. When the period for the heartbeat phase is expired, or when the heartbeat message from the neighbor devices are received and decrypted, whichever occurs earlier, the device can update its session key with its nonce. For example, when a function Timeout(t) is satisfied, i.e., $t \geq T_{lasehb} + T_{hb} + T_{acc}$, $D_i$ can update its session key $k_{ij}$ by using the nonce $n_i$ generated by itself. For example, the new session key $k_{ij}$ can be generated as $k_{ij} = k_{ij} \oplus n_i$. This new session key $k_{ij}$ will be used to encrypt a heartbeat message to be sent to $D_j$ in a next heartbeat period, and decrypt a heartbeat message to be received from $D_j$ in the next heartbeat period.

In response to the report of absence messages, the node O may send attestation requests attest to all suspicious devices and corresponding verifier device, in order to prevent malicious report. In response to the attestation requests, the suspicious devices and corresponding verifier device will do the self-measurements of the software integrity and respond the result.

For example, if the node O received an absence message from Di, which accuses $D_j$ of a suspicious device, then both Di and Di may be requested to do the self-measurements of the software integrity and respond the result. Because the heartbeat message just transmitted in one hop, network delay can be omitted. Then, the attestation result will show three situations.

1) The node O doesn't receive $D_j$'s response and $D_i$ shows a healthy result. Then, the node O can delete $D_j$ from the network topology and inform all other devices in the network that $D_j$ was physically attacked;
2) $D_j$ shows a healthy result and $D_i$ shows to be compromised. Then the node O can regard the absence message as a false report, then deletes $D_i$;
3) Both $D_i$ and $D_j$ show compromised results. Then the node O can delete $D_i$ and $D_j$.

In some embodiment, the node O may further do some repair on these compromised devices.

Figure 4:
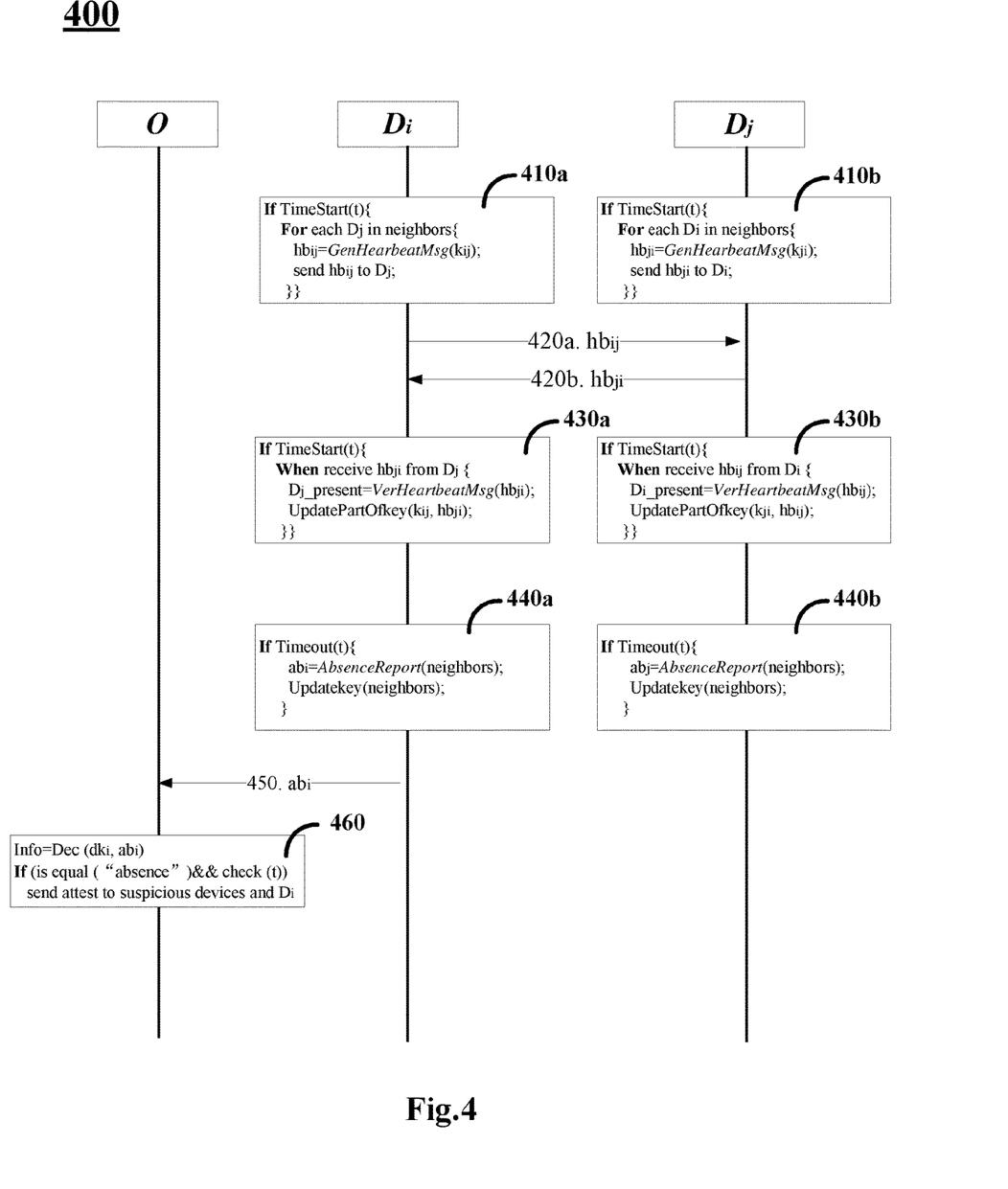
FIG. 4 is a diagram depicting a procedure for attesting physical attacks in a network according to some embodiments of the present disclosure.

FIG. 4 shows a procedure for distributed attestation in a network according to some embodiments. At 410a and 410b, each devices in the network proceeds into a heartbeat phase in a loosely synchronized manner. $D_i$ and $D_j$ can generate heartbeat messages $hb_{ij}$ and $hb_{ji}$, respectively, in each heartbeat period at a same time. These heartbeat messages can be sent to corresponding neighbor devices, as shown at 420a and 420b. Accordingly, these heartbeat messages can be received by corresponding neighbor devices as shown at 430a and 430b. In 430a and 430b, each device can check the presence of its neighbor devices through the function VerHeartbeatMsg( ) and update the session key to be used in a next heartbeat period through the function UpdatePartOfKey( ), as described above. Then, each device can report the absence of suspicious devices, as shown at 440a and 440b. Meanwhile, the devices can update its session key for a next round of heartbeat message transferring with neighbor devices. For example, if $D_j$ is suspicious to be physically compromised, $D_i$ can send a report message $ab_i$ to the node O, as shown at 450. The message $ab_i$ can be encrypted with a symmetric key $dk_i$ of $D_i$. At 460, the node O can decrypt the message $ab_i$ with the symmetric key $dk_i$, and send a request of self-measurement to the suspicious device $D_j$ and the report device $D_i$.

This disclosure introduces an accusation mechanism to ensure a quick response to the suspicious physically attacked devices. Furthermore, by utilizing a distributed attestation mode, where each device is verified by its neighbors, the accusation mechanism can protect against the single point failure and reduce the memory consumption. By utilizing a loosely synchronized clock equipped in every device to trigger the attestation protocol, each device can execute the protocol at the same time. It reduces the run-time to a fixed value. Furthermore, by designing a zero-round identify-based authentication scheme, each device can authenticate others with the session keys, which are changed with heartbeat message sending. It insures a freshness of every heartbeat message and can quickly disconnect suspicious devices.

Figure 5:
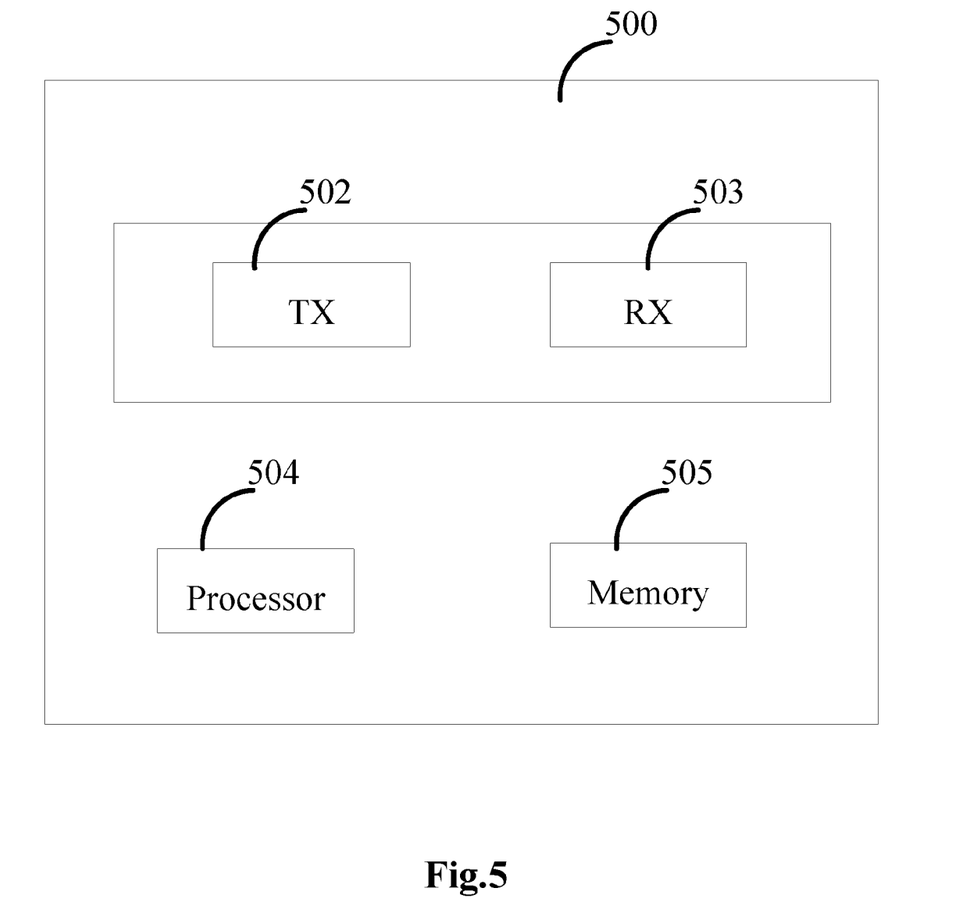
FIG. 5 shows a simplified block diagram of an apparatus according to an embodiment of the present disclosure.

FIG. 5 shows a simplified block diagram of an apparatus according to an embodiment of the present disclosure. The apparatus 500 can be implemented as a device $D_i$ or a module thereof as shown in FIGS. 1 and 4. As shown in FIG. 5, the apparatus 500 comprises a processor 504, a memory 505, and a transceiver 501 in operative communication with the processor 504. The transceiver 501 comprises at least one transmitter 502 and at least one receiver 503. While only one processor is illustrated in FIG. 5, the processor 504 may comprises a plurality of processors or multi-core processor(s). Additionally, the processor 504 may also comprise cache to facilitate processing operations. For some same or similar parts which have been described with respect to FIGS. 1-4, the description of these parts is omitted here for brevity.

Computer-executable instructions can be loaded in the memory 505 and, when executed by the processor 504, cause the apparatus 500 to implement the above-described methods.

Additionally, an aspect of the disclosure can make use of software running on a computing device. Such an implementation might employ, for example, a processor, a memory, and an input/output interface formed, for example, by a display and a keyboard. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, random access memory (RAM), read only memory (ROM), a fixed memory device (for example, hard drive), a removable memory device (for example, diskette), a flash memory and the like. The processor, memory, and input/output interface such as display and keyboard can be interconnected, for example, via bus as part of a data processing unit. Suitable interconnections, for example via bus, can also be provided to a network interface, such as a network card, which can be provided to interface with a computer network, and to a media interface, such as a diskette or CD-ROM drive, which can be provided to interface with media.

Accordingly, computer software including instructions or code for performing the methodologies of the disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

As noted, aspects of the disclosure may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Computer program code for carrying out operations for aspects of the disclosure may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

The flowchart and block diagrams in the figures illustrate the architecture, functionality, and operation of possible implementations of systems, methods and computer program products according to various embodiments of the disclosure. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially simultaneously, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In any case, it should be understood that the components illustrated in this disclosure may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. It will be further understood that the terms "comprises", "containing" and/or "comprising," when used in this specification, specify the presence of stated features, integers, steps, operations, elements, and/or components, but do not preclude the presence or addition of another feature, integer, step, operation, element, component, and/or group thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method implemented at a first device, comprising:
receiving a first heartbeat message from a neighbor device at a periodic interval, wherein the first heartbeat message is encrypted with a session key of the neighbor device for a current interval, and comprises a first key material for updating the session key of the neighbor device for a next interval;
decrypting the received first heartbeat message based at least part on a session key of the first device for the current interval;
determining whether the neighbor device is physically compromised at least based on the first heartbeat message;
obtaining the first key material from the decrypted first heartbeat message;
updating the session key of the first device for the next interval based at least part on the first key material; and,
generating and sending a second heartbeat message to the neighbor device at the periodic interval,
wherein the second heartbeat message is encrypted with the session key of the first device for the current interval,
wherein the second heartbeat message comprises a second key material for updating the session key of the first device for the next interval, and
wherein the periodic interval is set to be smaller than a minimum time of a physical attack on the neighbor device.

2. The method according to claim 1, further comprising:
obtaining the session key of the first device for the current interval from a network managing device.

3. The method according to claim 1, wherein determining whether the neighbor device is physically compromised comprises,
determining that the neighbor device is physically compromised, under any one of the following conditions,
no first heartbeat message is received from the neighbor device within the current interval,
the received first heartbeat message is not successfully decrypted, or
the decrypted first heartbeat message is not valid.

4. The method according to claim 3, wherein if it is determined that the neighbor device is physically compromised, the method further comprises:
sending a report to a network managing device indicating that the neighbor device is suspicious to be physically compromised.

5. The method according to claim 4, further comprising:
doing a self-measurement of software integrity at the first device; and
sending a result of the self-measurement to the network managing device.

6. The method according to claim 1, further comprising:
updating the session key of the first device for the next interval based at least part on the second key material.

7. An apparatus at a first device, comprising:
at least one processor;
at least one memory including computer program code, the memory and the computer program code configured to, working with the at least one processor, cause the apparatus to:
receive a first heartbeat message from a neighbor device at a periodic interval, wherein the first heartbeat message is encrypted with a session key of the neighbor device for a current interval, and comprises a first key material for updating the session key of the neighbor device for a next interval;
decrypt the received first heartbeat message based at least part on a session key of the first device for the current interval;
determine whether the neighbor device is physically compromised at least based on the first heartbeat message;
obtain the first key material from the decrypted first heartbeat message;
update the session key of the first device for the next interval based at least part on the first key material; and,
generate and send a second heartbeat message to the neighbor device at the periodic interval,
wherein the second heartbeat message is encrypted with the session key of the first device for a current interval,
wherein the second heartbeat message comprises a second key material for updating the session key of the first device for a next interval, and,
wherein the periodic interval is set to be smaller than a minimum time of a physical attack on the neighbor device.

8. The apparatus according to claim 7, wherein the memory and the computer program code is configured to, working with the at least one processor, further cause the apparatus to,
obtain the session key of the first device for the current interval from a network managing device.

9. The apparatus according to claim 7, wherein the memory and the computer program code is configured to, working with the at least one processor, further cause the apparatus to,
determine that the neighbor device is physically compromised, under any one of the following conditions,
no first heartbeat message is received from the neighbor device within the current interval,
the received first heartbeat message is not successfully decrypted, or
the decrypted first heartbeat message is not valid.

10. The apparatus according to claim 9, wherein if it is determined that the neighbor device is physically compromised, the memory and the computer program code is configured to, working with the at least one processor, further cause the apparatus to,
send a report to a network managing device indicating that the neighbor device is suspicious to be physically compromised.

11. The apparatus according to claim 10, wherein the memory and the computer program code is configured to, working with the at least one processor, further cause the apparatus to,
do a self-measurement of software integrity at the first device; and
send a result of the self-measurement to the network managing device.

12. The apparatus according to claim 7, wherein the memory and the computer program code is configured to, working with the at least one processor, further cause the apparatus to,
update the session key of the first device for the next interval based at least part on the second key material.

13. The apparatus according to claim 12, wherein the receiving of the first heartbeat message is timed within a period from a start of the current interval, and the sending of the second heartbeat message is timed within the period from the start of the current interval.

14. The apparatus according to claim 13, wherein the updating of the session key of the first device for the next interval based at least part on the second key material is executed after the decrypting of the received first heartbeat message, or an expiration of the period from the start of the current interval, whichever occurs earlier.

15. The apparatus according to claim 7, wherein the memory and the computer program code is configured to, working with the at least one processor, further cause the apparatus to, keep synchronization between the first device and the neighbor device for the transmission of the first heartbeat message and the second heartbeat message.

16. The apparatus according to claim 7, wherein the first device and the neighbor device are internet of things devices.

17. The apparatus according to claim 7, wherein the first key material for generating the session key comprises a nonce.

18. A non-transitory computer readable storage medium comprising program instructions to cause an apparatus to perform at least the following:
receiving a first heartbeat message from a neighbor device at a periodic interval, wherein the first heartbeat message is encrypted with a session key of the neighbor device for a current interval, and comprises a first key material for updating the session key of the neighbor device for a next interval;
decrypting the received first heartbeat message based at least part on a session key of the apparatus for the current interval;
determining whether the neighbor device is physically compromised at least based on the first heartbeat message;
obtaining the first key material from the decrypted first heartbeat message; and
updating the session key of the first device for the next interval based at least part on the first key material; and,
generating and sending a second heartbeat message to the neighbor device at the periodic interval,
wherein the second heartbeat message is encrypted with the session key of the first device for the current interval,
wherein the second heartbeat message comprises a second key material for updating the session key of the first device for the next interval, and wherein the periodic interval is set to be smaller than a minimum time of a physical attack on the neighbor device.

\* \* \* \* \*